United States Patent [19] [11] 4,056,876
Lämmermann [45] Nov. 8, 1977

[54] METHOD OF MAKING A FILTER

[75] Inventor: Heinz Lämmermann, Nurnberg, Germany

[73] Assignee: Robert Bosch GmbH, Stuttgart, Germany

[21] Appl. No.: 722,214

[22] Filed: Sept. 10, 1976

[30] Foreign Application Priority Data

Oct. 25, 1975 Germany .................. 2547904

[51] Int. Cl.² .............................................. B65B 7/00
[52] U.S. Cl. ................................. 29/469.5; 29/511;
55/514; 156/69; 156/196; 156/293; 210/493 R;
220/81 R
[58] Field of Search ..................... 55/498, 502, 514;
210/493; 156/196, 69, 293, 294, 295, 321;
222/146 HE; 215/232, 233; 220/81 R; 29/163.5
F, 458, 469.5, 509, 511; 113/80 BA, 80 DA, 80
R

[56] References Cited
U.S. PATENT DOCUMENTS

| 2,313,750 | 3/1943 | Hothersall | 113/80 BA |
|---|---|---|---|
| 2,979,224 | 4/1961 | Henchert | 29/458 |
| 3,392,843 | 7/1968 | Mumby | 210/493 |
| 3,441,293 | 4/1969 | Babnvio | 29/511 |
| 3,540,394 | 11/1970 | Ibnell | 113/80 R |
| 3,652,362 | 3/1972 | Odabiri | 156/321 |
| 3,712,033 | 1/1973 | Gronholz | 55/502 |
| 3,752,321 | 8/1973 | McLaren | 210/493 |

Primary Examiner—Edward G. Whitby
Attorney, Agent, or Firm—Michael J. Striker

[57] ABSTRACT

A filter element is fitted into a filter can and a mass of hot-melt adhesive between the filter element and the can is thermally activated and allowed to cure to hold this filter element in place. A bead of hot-melt adhesive is applied to the rim of the can and the edge of a cover is applied over this bead which may be heated to its softening range. Thereafter the rim of the can is bent over the edge of the cover and this bent-over rim is heated to the melting point of the hot-melt adhesive so as to secure the two together once the hot-melt adhesive has cured.

9 Claims, 5 Drawing Figures

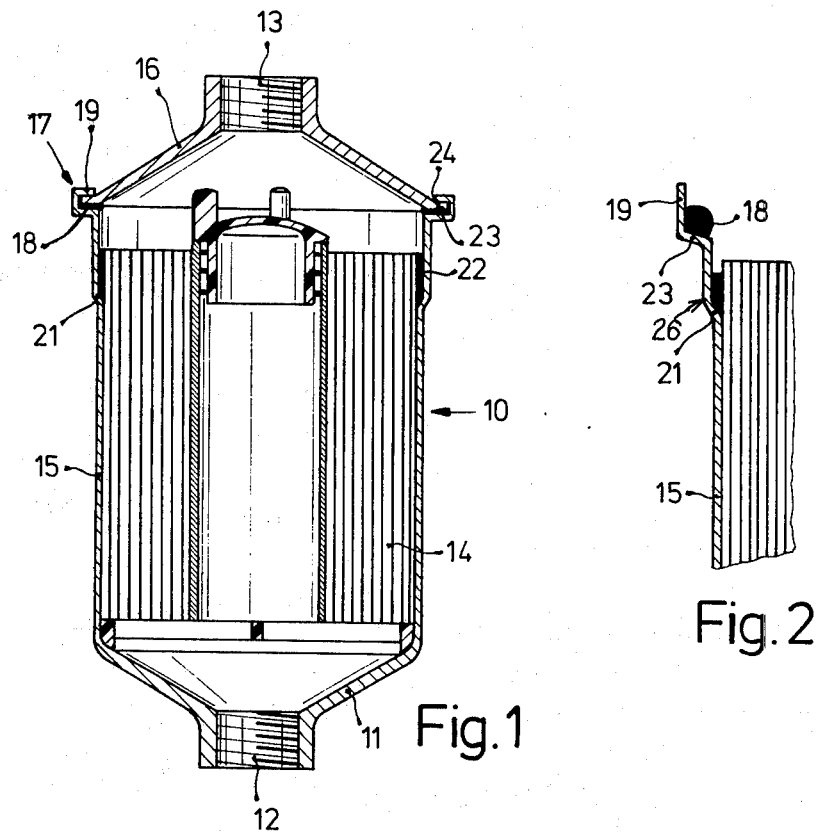
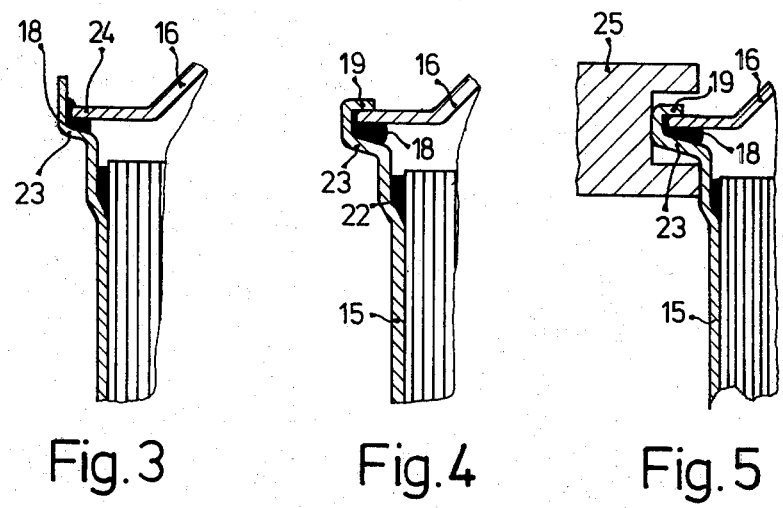

METHOD OF MAKING A FILTER

BACKGROUND OF THE INVENTION

The present invention relates to a method of closing a container. More particularly this invention concerns the fabrication of a filter.

It is known to make a filter by mounting a filter element tightly inside a container and then sealing a cover over the open side of the container. This sealing is frequently done by means of a two-component adhesive of the epoxy type. Thus immediately prior to the application of the cover to the rim of the container this rim is coated with the adhesive in liquid or runny condition. Then the two elements are mounted together and, if desired, the rim is bent or crimped over the edge of the cover. Such a method produces an extremely tight and strong bond.

Nevertheless, this arrangement has the considerable disadvantage that it is relatively messy. When used in a production line the epoxy adhesive frequently dirties the conveyor belt and other equipment. Since such epoxy dries to an extremely hard condition deposits of this adhesive are extremely hard to remove and bothersome. Furthermore this method requires a relatively quick operation, as if the epoxy is allowed to dry it is impossible to form a proper bond between the two elements. Another disadvantage is that the epoxy does not harden rapidly, so that it is necessary to set the freshly sealed filters aside and only test the seal at a later time. Obviously, this latter disadvantage greatly slows production rate.

SUMMARY OF THE INVENTION

It is therefore an object of the present invention to provide an improved method of closing a container.

Another object is the provision of an improved method for making a filter.

These objects are attained according to the present invention in a method wherein a line of a hot-melt adhesive in non-liquid form is provided around the rim of the open side of the container to be sealed. Thereafter a cover is applied over the open side with its edge in contact with the line of adhesive. The rim is then bent around the edge of the cover and the bent-over rim is heated to melt the adhesive. Finally the rim is allowed to cool to cure this adhesive.

This method has the considerable advantage that the adhesive can be applied in nonliquid form relatively easily to the rim of the container. Thus the messiness of the prior-art arrangement if fully avoided. Furthermore it is not necessary with this system to immediately apply the cover to the open side of the container, as the notyet activated adhesive can remain standing for an almost indefinite time before it is thermally activated. Finally the curing with this method is relatively fast so that it is possible to test the container almost immediately after it has been assembled, thereby greatly increasing production speed.

According to further features of this invention the container is formed adjacent its rim with a shoulder and an annular bead or strand of the adhesive is squeezed around this shoulder. Then the edge of the cover is fitted onto the shoulder and the rim is bent over the edge so as to secure the assembly together. Thereafter, even much later, it is possible to heat this bent-over rim and melt the adhesive.

According to yet another feature of this invention the container or strand of adhesive is heated to within the softening range of the adhesive before application of the cover to the rim. The softening range is the temperature at which the adhesive mass is soft, but not yet liquid or runny.

The filter container according to this invention is provided before provision of the line of adhesive internally with a filter element. This element is secured in place in said filter by a mass of hot-melt adhesive which is also melted by application of heat to the container to secure this filter element in place. Thus it is possible in a relatively simple operation to form a filter which has a very tight seal, and yet which can be produced at extremely high speed.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWING

FIG. 1 is an axial section through a filter produced according to the method of this invention; and FIGS. 2, 3, 4 and 5 are detail views illustrating fabrication of the filter of FIG. 1.

SPECIFIC DESCRIPTION OF A PREFERRED EMBODIMENT

As shown in FIG. 1 a filter 10 according to the present invention comprises a generally cylindrical can 15 having a lower end 11 provided with an axis-defining inlet opening 12 and having an upper edge or rim 17 to which is secured a cover 16 having an axially aligned outlet opening 13. Within this filter can 15 there is provided an annular filter element 14 formed by winding a band of filter cloth.

As shown in FIG. 2 the filter element 14 is secured within the can 15 by an annular mass 21 of a hot-melt adhesive. To this end the can 15 which, as mentioned above, is of cylindrical shape is formed with a shoulder 26. To this end the region above the shoulder 26 is heated above the melting point of the adhesive, then the filter element 14 is forced into the can 15, and as the mass 21 dries it secures this element 14 in place. This method is described in German published specification No. 2,256,995.

Thereafter as also shown in FIG. 2 a circular-section bead 18 of a hot-melt adhesive is applied to a shoulder 23 formed at the rim 19. Before application of this bead 18 the shoulder 23 is heated to the softening range of the hot-melt adhesive 23.

Thereafter as shown in FIG. 3, the cover 16 is applied to the can 15 with its outer edge 24 pressed down onto the bead 18 on the shoulder 23. This deforms the bead 18 as shown in FIG. 3.

Subsequently the rim 19 is bent over the edge 24 as shown in FIG. 4. This turns the assembly into a relatively stable body which can be handled without any fear of dirtying conveyor belts or the like.

Finally, as shown in FIG. 5 a tool 25 heated to above the melting point of the adhesive bead 18 is juxtaposed with the bent-over rim 19 so as to melt the bead 18 and form a very tight bond between the shoulder 23 and edge 24. Thereafter the bead 18 hardens relatively rapidly as the heat is conducted away from this bead 18 by the metal forming the cover 16 and can 15.

According to this invention the adhesive 18 and the adhesive mass 21 are of a polyamide base. Furthermore it is noted that the can 15 need not be cylindrical as shown, but can be of polygonal or any other desired shape.

It will be understood that the method described above may also find a useful application in other types of constructions differing from the type described above.

While the invention has been illustrated and described as embodied in a method, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of closing a metal filter can comprising the steps of sequentially:

providing around an annular shoulder adjacent the rim of an open side of said filter can an annular line of a hot-melt adhesive in nonliquid form;

applying a metal cover over said open side with its edge in contact with said annular line of adhesive in nonliquid form;

bending over said rim around said edge and thereby pressing said edge against said line and through said line against said shoulder;

heating the bent over rim to melt said adhesive; and curing said adhesive.

2. The method defined in claim 1 further comprising the step of heating said rim prior to provision of said line to a temperature in the softening range of said adhesive.

3. The method defined in claim 1 wherein said rim is annular and said line is formed as an annulus within said rim.

4. The method defined in claim 3 wherein said rim has a shoulder and said annulus is provided on said shoulder, said rim being bent over adjacent said shoulder to press said edge down on said shoulder.

5. The method defined in claim 1 wherein said rim is heated by conduction with a tool heated to a temperature above the melting point of said adhesive.

6. The method defined in claim 1, further comprising the step of prior to application of said cover heating said rim and said line to a temperature in the softening range of said adhesive.

7. The method defined in claim 1, further comprising the steps of prior to provision of said line: mounting a filter element inside said can; and adhesively securing said element to said container.

8. The method defined in claim 7 wherein said element is adhesively secured in said can by providing a hot-melt adhesive mass between said element and an inner surface of said can, thereafter heating said can at said mass to the melting point of said mass, and thereafter curing said mass.

9. The method defined in claim 8 wherein said line and said mass are of the same polyamide composition.

* * * * *